United States Patent Office 3,557,286
Patented Jan. 19, 1971

3,557,286
THERAPEUTIC COMPOSITIONS AND METHOD FOR THE TREATMENT OF DISORDERS DUE TO INSUFFICIENT CORPUS LUTEUM SECRETION
Robert Joly, Montmorency, Julien Warnant, Neuilly-sur-Seine, and André Farcilli, Rosny-sous Bois, France, assignors to Roussel-UCLAF, Paris, France, a corporation of France
No Drawing. Filed Dec. 21, 1966, Ser. No. 603,458
Claims priority, application France, Dec. 27, 1965, 43,815
Int. Cl. A61k 17/06
U.S. Cl. 424—242                              3 Claims

ABSTRACT OF THE DISCLOSURE

Therapeutic compositions and method for the treatment of disorders due to an insufficient secretion of the corpus luteum.

---

The invention relates to novel compositions for the treatment of disorders in warm-blooded animals due to insufficient secretion of the corpus luteum in which the active principle is 17α-methyl-19-nor-$\Delta^{4,9}$-pregnadiene-3,20-dione having the formula

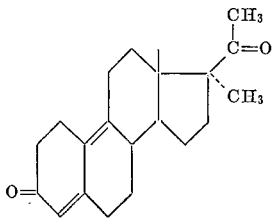

The invention also relates to a novel method of treating disorders in warm-blooded animals due to insufficient corpus luteum secretion.

OBJECTS OF THE INVENTION

It is an object of the invention to provide novel therapeutic compositions for the treatment of disorders due to insufficient corpus luteum secretion.

It is another object of the invention to provide a novel method for treating disorders in warm-blooded animals due to insufficient corpus luteum secretion.

These and other objects and advantages of the invention will become obvious from the following detailed description.

The novel therapeutic compositions of the invention are comprised of an effective amount of 17α-methyl-19-nor-$\Delta^{4,9}$-pregnadiene-3,20-dione and a major amount of a pharmaceutical carrier. The compositions may be prepared in the form of injectable solutions or suspensions put up in ampoules or multiple dose flacons, and in the form of tables, coated tables, sublingual tablets, gelatine tablets, emulsions and suppositories prepared in the usual manner.

17α-methyl-19-nor-$\Delta^{4,9}$-pregnadiene-3,20 - dione, which is described in Belgian Pat. No. 674,178, possesses an important progestomimetic activity making it one of the most active progestatives and it is particularly valuable because it can be orally administered.

The said therapeutic compositions are useful for the treatment of amenorrhea, of hypermenorrhea, metrorrhagia, menorrhagia, sterility, abortion, all of the hyperfolliculinic manifestations, of nervous and psychic symptoms connected therewith, and of hypogalactic manifestations, and for the treatment in a general fashion of all of the disorders connected with a luteinic insufficiency.

Preferably, said compositions contain 2 to 20 mgm.
per dose of 17α - methyl - 19-nor-$\Delta^{4,9}$-pregnadiene-3,20-dione.

The method of the invention for the treatment of disorders in warm-blooded animals due to insufficient corpus luteum secretion comprises administering to a warm-blooded animal an effective amount of 17α-methyl-19-nor-$\Delta^{4,9}$-pregnadiene-3,20-dione. The said product may be administered orally, perlingually, transcutaneously or rectally. The usual useful daily dosage is 0.03 to 0.3 mg./kg. in the adult depending upon the method of administration.

In the following examples, there are described several preferred embodiments to illustrate the invention. However, it should be understood that the invention is not intended to be limited to the specific embodiments.

EXAMPLE I

Tablets containing 10 mg. of 17α-methyl-19-nor-$\Delta^{4,9}$-pregnadiene-3,20-dione 17α-methyl-19-nor-$\Delta^{4,9}$-pregnadiene-3,20 - dione, 4.655 gm. of white sugar, 30.590 gm. of potato starch and 4.655 gm. of lactose were admixed to form a homogenous mixture to which was added a sufficient amount of an aqueous solution of gelatine to obtain a granulated mixture. The resulting granulate was spread out on a plate in a thin layer and dried in an aired oven at 50° C. The dried granulate was broken into small pieces and passed through a sieve of appropriate size and then was admixed with 10 gm. of talc and 2 gm. of magnesium stearate for lubrication. The granulated powdered substance was then pressed into tablets weighing 0.155 gm. The amount of 17α-methyl-19-nor-$\Delta^{4,9}$-pregnadiene-3,20-dione used in this example was the amount required to obtain a content of 10 mgm. of active material per tablet. The average weight tolerance of 10 tablet dose was ±5% of the theoretical weight.

EXAMPLE II

Injectable suspension containing 2% 17α-methyl-19-nor-$\Delta^{4,9}$-pregnadiene-3,20-dione 1000 gm. of 17α-methyl-19-nor-$\Delta^{4,9}$-pregnadiene-3,20-dione was suspended in 13,400 cc. of an aqueous solution of 250 gm. benzyl alcohol and heated to 100° C. to sterilize the said product and then it was pulverized to micro-sized particles in the aqueous medium under aseptic conditions. To the said concentrated suspension, there were added under aseptic conditions 15,000 cm.³ of an aqueous solution containing 18 parts per 1000 of sodium cloride, previously sterilized at 120° C. (to make solution isotonic), 200 gm. of sterilized benzyl alcohol (bacterostatic preservation), 200 gm. of polysorbate 80 (nonionic surface active agent), and a sufficient amount of an aqueous solution of 0.5 percent of sodium carboxymethyl-cellulose sterilized at 120° (viscosity agent), to adjust to 50 liters so as to obtain a suspension containing 2% of the active principle.

The suspension, which was kept homogenous by agitation, could be distributed under aseptic conditions into 1 cc. to 20 cc. ampoules or flacons. Injection suspensions containing between 0.5 to 20% of 17α - methyl-19-nor-$\Delta^{4,9}$-pregnadiene-3,20-dione can be prepared.

EXAMPLE III

Suppositories containing 10 mg. of 17α-methyl-19-nor-$\Delta^{4,9}$-pregnadiene-3,20-dione 0.100 kg. of 17α-methyl-19-nor-$\Delta^{4,9}$-pregnadiene-3,20-dione and 0.800 kg. of lactose were admixed by successive additions thereof to a small mixer and the resulting mixture was passed through a 60-mesh screen of stainless steel. Into a double lined container equipped with a stirring device, there was introduced first 19.230 kg. of melted cocoa butter at 50° C. which was allowed to cool to 35 to 40° C. after which it was agitated while 0.020 kg. of α-tocopherol was added thereto. The original container of α-tocopherol was rinsed out with a small quantity of melted cocoa butter which was added to the covered container. Then, the mixture of lactose and the active compound was added thereto in small fractions with agitation. The container, also provided with an airtight cover, was recovered and a light stream of nitrogen was introduced into the container. A stream of ice water was passed through the double liner until the batch had a tacky consistency, at about a temperature for the mixture of 25° C. and then the mixture was slightly reheated, (30 to 32° C.), by passing steam through the double liner to obtain a sufficiently liquid consistency for pouring. Agitation was continued during the entire procedure. The mixture was poured through a lateral opening into small cavities held in place by a metal frame while maintaining the liquid consistency temperature. After several minutes, the mixture solidified in the cavities and the cavities were smoothed off with a scraper. Then the cavities were placed in a refrigerator at −10° C. to complete the solidification. The frame-supported cavities were then removed from the refrigerator and emptied to obtain 10,000 suppositories having a final weight of 2 gm. and containing 10 mg. of 17α-methyl-19-nor-$\Delta^{4,9}$-pregnadiene-3,20-dione.

EXAMPLE IV

Injectable solution containing 10 mg. per cc. of 17α-methyl-19-nor-$\Delta^{4,9}$-pregnadiene-3,20-dione 0.500 l. of benzyl alcohol were heated to approximately 45–50° C. and then after 100 gm. of 17α-methyl-19-nor-$\Delta^{4,9}$-pregnadiene-3,20-dione were added thereto, the heating was continued until complete dissolution of the mixture was obtained. Thereafter, 7 liters of neutral olive oil were added in successive fractions under agitation and followed by the addition of 0.300 l. of absolute alcohol. The solution was then agitated until a homogeneous solute was obtained. This solute was filtered through a filter lined with a stiff paper previously rinsed in oil. After the filtration, the filter was again rinsed with 0.500 l. of olive oil, and the filtrate was agitated until a homogeneous solution was obtained. Thereafter, the volume was increased to 10 liters by the addition of olive oil. The solution was put up in ampoules of 1 cc. which were sterilized in an autoclave according to the usual methods.

PHARMACOLOGICAL STUDY

Determination of the progestomimetic activity (A) Oral administration.—The progestomimetic activity of 17α-methyl-19-nor-$\Delta^{4,9}$-pregnadiene-3,20-dione was determined by the Clauberg test conducted on immature rabbits, which had been previously sensitized by subcutaneous administration of estradiol benzoate over a period of 5 days with a daily dose of 10 μg. The said product was utilized as a solution in olive oil admixed with 5% of benzylic alcohol and was orally administered for 5 days at doses of 5γ, 10γ and 20γ per day. The animals were sacrificed on the 6th day and the jagged proliferation of the endometritis on sections of the uterus which is characteristic of the progestomimetic action was noted.

For comparative purposes, 6α-chloro-17α-acetoxy-$\Delta^{4,6}$-pregnadiene-3,20-dione was administered in the same solvent and at identical doses. The results of the test expressed in MacPhail units, are summarized in Table I.

TABLE I

| | MacPhail units | | |
|---|---|---|---|
| Products given orally, daily dose in γ | 5 | 10 | 20 |
| 17α-methyl-19-nor-$\Delta^{4,9}$-pregnadiene-3,20-dione | 0.4 | 2.0 | 2.6 |
| 6α-chloro-17α-acetoxy-$\Delta^{4,6}$-pregnadiene-3,20-dione | 1.6 | 2.0 | 2.0 |

Table I shows that 17α-methyl-19-nor-$\Delta^{4,9}$-pregnadiene-3,20-dione, when orally administered, has a progestomimetic activity approximately equal to that of 6α-chloro-17α-acetoxy-$\Delta^{4,6}$-pregnadiene-3,20-dione.

(B) Subcutaneous administration.—The test was performed under the same experimental conditions as in test A except that the products were subcutaneously administered. The product of the invention and 6α-chloro-17α-acetoxy-$\Delta^{4,6}$-pregnadiene-3,20-dione were administered as solutions in olive oil admixed with 5% of benzylic alcohol at doses of 1.56γ, 3.12γ and 6.25γ per day. The results are summarized in Table II and are expressed in MacPhail units.

TABLE II

| | MacPhail units | | |
|---|---|---|---|
| Products given subcutaneously daily doses in γ | 1.56 | 3.12 | 6.25 |
| 17α-methyl-19-nor-$\Delta^{4,9}$-pregnadiene-3,20-dione | 0.7 | 2 | 2.5 |
| 6α-chloro-17α-acetoxy-$\Delta^{4,6}$-pregnadiene-3,20-dione | 1.0 | 2.4 | 2.4 |

Table II shows that 17α-methyl-10-nor-$\Delta^{4,9}$-pregnadience-3,20-dione, when subcutaneously administered, has a progestominetic activity about equal to that of 6α-chloro-17α-acetoxy-$\Delta^{4,6}$-pregnadiene-3,20-dione at a dose of 3,12γ per day.

(C) Test for maintaining gestation.—This test was based on the fact that abortion, which is customary with rabbits subjected to ovariectomy during gestation, could be prevented by an appropriate treatment replacing the ovarian hormones. Rabbits, castrated on the 14th day of their gestation, were treated daily from the 13th to the 27th day by subcutaneous administration of 17α-methyl-19-nor-$\Delta^{4,9}$-pregnadiene-3,20-dione as a solution in olive oil admixed with 5% of benzylic alcohol. The animals were sacrificed on the 28th day. The fetuses were removed, counted, measured and weighed. The number of fetuses carried by each rabbit was estimated as well as, in the present case, the number of macerated placentas present. The latter corresponded to abortions.

17α-methyl-19-nor-$\Delta^{4,9}$-pregnadiene-3,20-dione was administered subcutaneously at daily doses of 0.0125 mg., 0.025 mg. and 0.050 mg. respectively per group of rabbits. As a comparison, three lots of rabbits were castrated after becoming pregnant under the same conditions and treated respectively with daily doses of 0.025 mg., 0.050 mg. and 0.100 mg. of 6α-chloro-17α-acetoxy-$\Delta^{4,6}$-pregnadiene-3,20-dione administered subcutaneously in the same solvent.

Whereas the dose of 0.025 mg. of 6α-chloro-17α-acetoxy-$\Delta^{4,6}$-pregnadiene-3,20-dione did not prevent a total abortion, the identical dose of 17α-methyl-19-nor-$\Delta^{4,9}$-pregnadiene-3,20-dione maintained gestation for the rabbits in 50% of the cases. Therefore, 17α-methyl-19-nor-$\Delta^{4,9}$-pregnadiene-3,20-dione manifested a true gestative action starting with the dose of 0.025 mg. per day.

Various modifications of the compositions and method of the invention may be made without departing from the spirit or scope thereof and it is to be understood that the invention is to be limited only as defined in the appended claims.

We claim:
1. A composition for the treatment of luteinic insufficiency comprising 2 to 20 mg. of 17α-methyl-19-nor-$\Delta^{4,9}$-pregnadiene-3,20-dione and a major amount of a pharmaceutical carrier.
2. The composition of claim 1 in tablet form.
3. A method of treating luteinic insufficiency which comprises administering to female warm-blooded animals having insufficient corpus luterm secretion daily 0.03 to 0.3 mg./kg. of 17α-methyl-19-nor-$\Delta^{4,9}$-pregnadiene-3,20-dione.

References Cited

UNITED STATES PATENTS 3,346,454  10/1967  Bucourt _____ 167—74

SAM ROSEN, Primary Examiner